(12) United States Patent
Teh

(10) Patent No.: US 8,832,041 B1
(45) Date of Patent: Sep. 9, 2014

(54) IDENTIFYING DUPLICATE ENTRIES

(75) Inventor: Hakson Teh, Mercer Island, WA (US)

(73) Assignee: Google Inc., Mountain View, CA (US)

( * ) Notice: Subject to any disclaimer, the term of this patent is extended or adjusted under 35 U.S.C. 154(b) by 127 days.

(21) Appl. No.: 13/235,315

(22) Filed: Sep. 16, 2011

(51) Int. Cl.
*G06F 7/00* (2006.01)
*G06F 17/00* (2006.01)

(52) U.S. Cl.
USPC .......................................................... 707/690

(58) Field of Classification Search
None
See application file for complete search history.

(56) References Cited

U.S. PATENT DOCUMENTS

| | | | |
|---|---|---|---|
| 7,970,773 B1 * | 6/2011 | Thirumalai et al. | 707/749 |
| 2006/0184584 A1 * | 8/2006 | Dunn et al. | 707/200 |
| 2007/0050423 A1 * | 3/2007 | Whalen et al. | 707/200 |
| 2010/0005048 A1 * | 1/2010 | Bodapati et al. | 706/47 |
| 2010/0023511 A1 * | 1/2010 | Borodziewicz et al. | 707/5 |
| 2010/0174688 A1 * | 7/2010 | Anumakonda et al. | 707/692 |

* cited by examiner

*Primary Examiner* — Rehana Perveen
*Assistant Examiner* — Raheem Hoffler
(74) *Attorney, Agent, or Firm* — McDermott Will & Emery LLP

(57) ABSTRACT

Systems and methods for identifying duplicate entries within set of entries are provided. Method includes receiving the set of entries. Each entry comprises set of field values associated with field types. The set of field values comprises non-blank field values. The method also includes calculating hash value for plural ones of the non-blank field values in at least subset of the set of entries. The method also includes determining that hash value of first field value in first entry corresponds to hash value of second field value in second entry. The first field value and the second field value comprise non-blank field values. The method also includes determining that each non-blank field value in the first entry does not conflict with each non-blank field value in the second entry. The method also includes providing an indication that the first entry and the second entry comprise duplicate entries.

25 Claims, 5 Drawing Sheets

IDENTIFYING DUPLICATE ENTRIES

FIELD

The subject technology generally relates to data management and identifying duplicate entries.

BACKGROUND

Users of email, telephones, and computers typically store contact lists that include many contacts in association with their accounts. Oftentimes, these contact lists are generated in an unsystematic manner. For example, a user may manually add a contact to his/her contact list or the contact may be created automatically when the user sends an email, dials a telephone number or enters an address into a mapping service. As a result, contact lists associated with user accounts may include duplicate entries and may be disorganized. For instance, instead of storing all of the contact information for an example person, Lisa Simons, in one entry, a user account may include a first entry for the name "Lisa Simons" associated with the email address, lisa.simons@company.com, and a second entry for the name "Lisa Simons" associated with the telephone number 212-555-1234. The first entry may have been generated when the user sent an email to Lisa Simons, while the second entry may have been generated in a contact list on a mobile phone, that was later copied to the computer. In the above example, combining the two entries for Lisa Simons into a single entry may lead to more efficient memory use and make the contact list more manageable and user-friendly for a human user. As the foregoing illustrates, an approach to automatically identify and merge duplicate entries in an entry set may be desirable.

SUMMARY

The disclosed subject matter relates to a method for identifying duplicate entries within a set of entries. The method comprises receiving the set of entries. Each entry comprises a set of field values associated with field types. The set of field values comprises non-blank field values. The method also comprises calculating a hash value for plural ones of the non-blank field values in at least a subset of the set of entries. The method also comprises determining that a hash value of a first field value in a first entry corresponds to a hash value of a second field value in a second entry. The first field value and the second field value comprise non-blank field values. The method also comprises determining that each non-blank field value in the first entry does not conflict with each non-blank field value in the second entry. The method also comprises providing an indication that the first entry and the second entry comprise duplicate entries.

The disclosed subject matter further relates to a non-transitory computer-readable medium. The computer-readable medium comprises instructions that, when executed by a computer, cause the computer to implement a method for identifying duplicate entries within a set of entries. The instructions comprise code for receiving a set of entries. Each entry comprises a set of field values associated with field types. The set of field values comprises blank field values and non-blank field values. The instructions also comprise code for calculating a hash value for plural ones of the non-blank field values in at least a subset of the set of entries. The instructions also comprise code for determining that a hash value of a first field value in a first entry corresponds to a hash value of a second field value in a second entry. The first field value and the second field value comprise non-blank field values. The instructions also comprise code for determining that each non-blank field value in the first entry does not conflict with each non-blank field value in the second entry. The instructions also comprise code for providing an indication that the first entry and the second entry comprise duplicate entries.

The disclosed subject matter further relates to a system for identifying duplicate entries within a set of entries. The system comprises a computer. The computer is configured to receive the set of contact entries. Each contact entry comprises a set of field values associated with field types. The set of field values comprises non-blank field values. The computer is also configured to calculate a hash value for plural ones of the non-blank field values in at least a subset of the set of entries. The computer is also configured to determine that a hash value of a first field value in a first contact entry corresponds to a hash value of a second field value in a second contact entry. The first field value and the second field value comprise non-blank field values. The computer is also configured to determine that each non-blank field value in the first contact entry does not conflict with each non-blank field value in the second contact entry. The computer is also configured to provide an indication that the first contact entry and the second contact entry comprise duplicate entries.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several aspects of the disclosed subject matter are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology is related to approaches for identifying duplicate entries within a set of entries. One technique involves receiving the set of entries, for example a list of contact entries associated with an email account or a mobile phone. Each entry comprises a set of field values associated with field types. The set of field values comprises blank field values and non-blank field values. Exemplary field types include name, email, telephone, and street address. Exemplary field values include "John Smith" or "john.smith@email.com." The technique also involves calculating a hash value for plural ones of the non-blank field values in at least a subset of the set of entries. The hash function may produce a unique hash value for each unique field value. The technique also involves determining that a hash value of a first field value in a first entry is equal to or corresponds to a hash value of a second field value in a second entry, implying that the first entry and the second entry have a common field value, for example, a common telephone field value. The first field value and the second field value comprise non-blank field values. The technique also involves determining that each non-blank field value in the first entry does not conflict with each non-blank field value in the second entry. A conflict occurs when two entries cannot be associated with the same entry or person. For example, the two entries with the common telephone field value might have the names "Carl Wong" and "Maria Hernandez," indicating that the two entries may not be a duplicate entry, as a single entry may not be associated with both names. The technique also involves providing an indication that the first entry and the second entry comprise duplicate entries.

Figure 1:
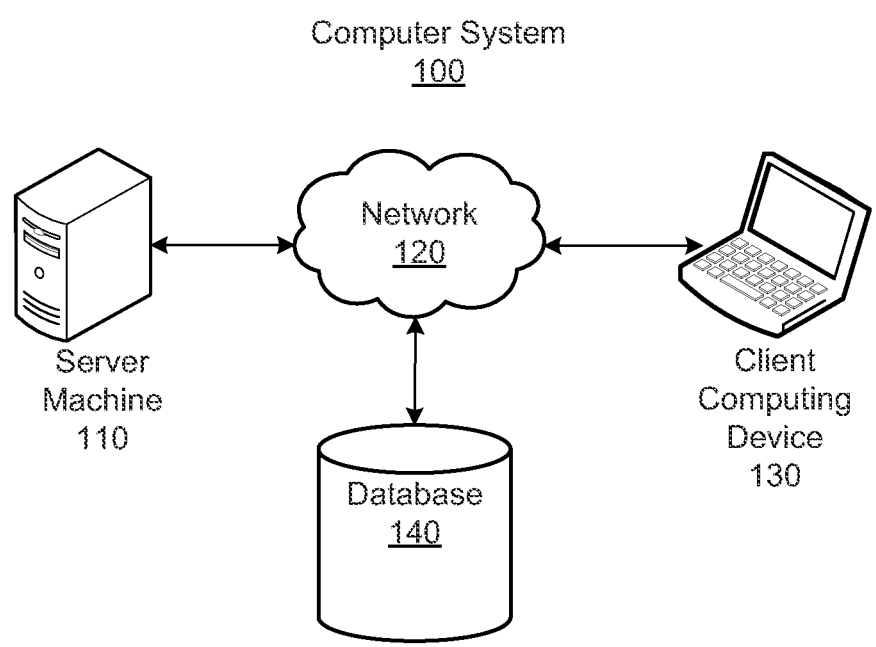
FIG. 1 illustrates an example of a computer system configured to implement identifying duplicate entries.

FIG. 1 illustrates an example of a computer system 100 configured to implement identifying duplicate entries.

As shown, the computer system 100 includes a server machine 110, a network 120, a client computing device 130, and a database 140. The server machine 110, client computing device 130, and database 140 may be configured to communicate with one another via the network 120. The network 120 may be the Internet, an intranet, a cellular network, a local area network (LAN), a wide area network (WAN) or any other network that may be configured to allow multiple devices to communicate with one another.

While only one database 140, server machine 110, and client computing device 130 are illustrated, persons skilled in the art will understand that the techniques disclosed herein may be implemented with one or more databases 140, server machines 110, and client computing devices 130. Furthermore, while the subject technology may be implemented in a network-based computer system 100, persons skilled in the art will understand that a single computing device that performs the functions of both the database 140 and the server machine 110 or all three of the database 140, the server machine 110 and the client computing device 130 may also implement the subject technology. The single computing device may or may not be connected to a network 120.

The database 140 is configured to store data that may be accessible to the server machine 110. For example, the database may store multiple user accounts, each of which is associated with a contact list that includes multiple entries. The database is described in more detail in conjunction with FIG. 2 below.

The server machine 110 is configured to execute instructions that may, among other things, add, modify or delete data from the database 140. The server machine 110 may also provide an interface for a user of the client computing device 130 to access the data in the database 140 via the network 120. The server machine is described in more detail in conjunction with FIG. 3 below.

The client computing device 130 may be any computing device capable of interacting with the data in the database 140 via the server machine 110. The client computing device 140 may be a laptop computer, a desktop computer, a mobile phone, a personal digital assistant (PDA), a tablet computer, a netbook, a physical machine or a virtual machine. Persons skilled in the art will recognize other devices that could implement the functionalities of the client computing device 130. The client computing device 130 may include one or more of a keyboard, a mouse, a touch screen, and a display to allow the user to interact with the database 140 or the server machine 110. Furthermore, while only one client computing device 130 is illustrated here, persons skilled in the art will recognize that the techniques disclosed herein may be implemented with multiple client computing devices 130.

Figure 2:
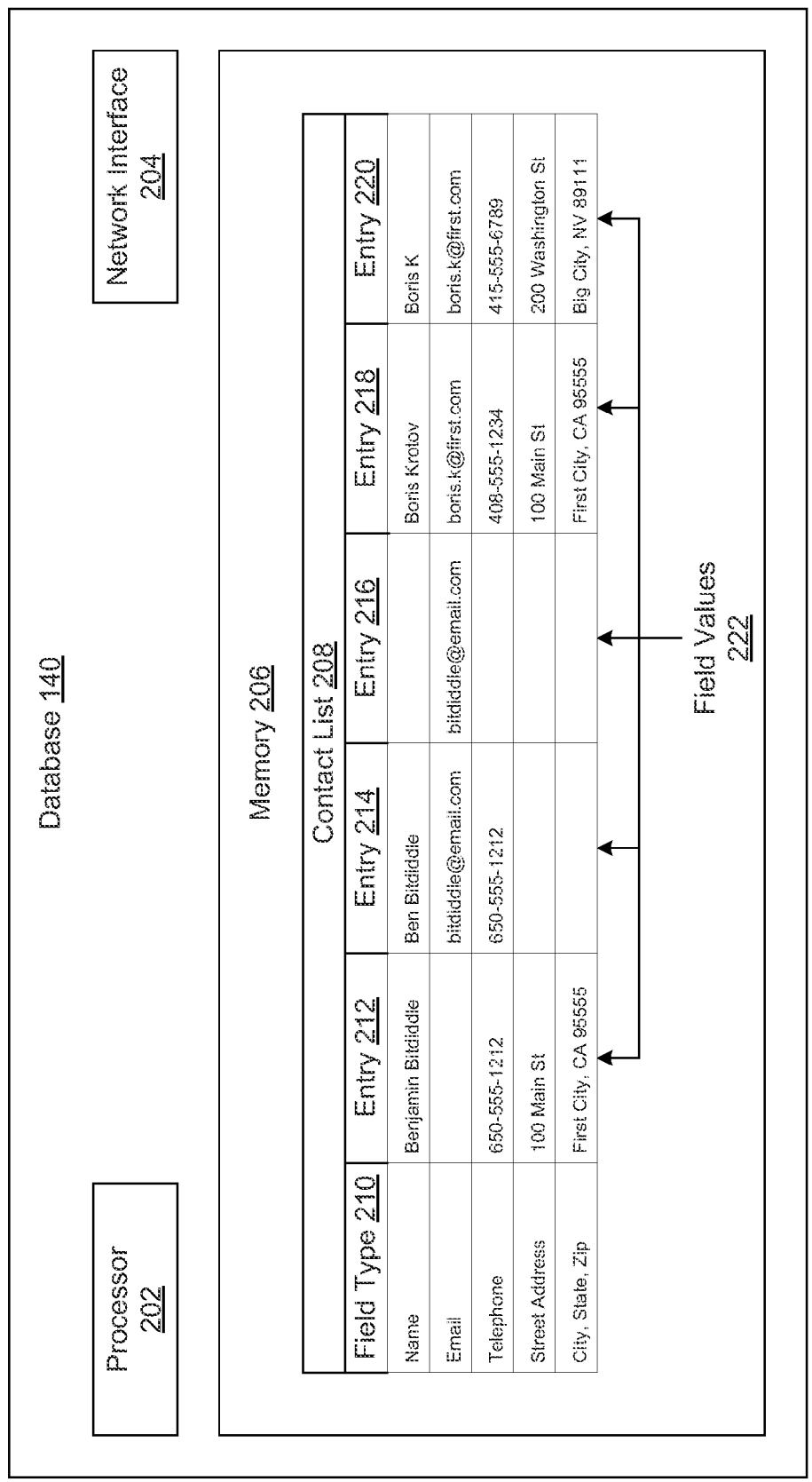
FIG. 2 illustrates an example of the database of FIG. 1 in more detail.

FIG. 2 illustrates an example of the database 140 of FIG. 1 in more detail.

As shown, the database 140 includes a processor 202, a network interface 204, and a memory 206. The processor 202 is configured to execute computer instructions that are stored in a computer-readable medium, such as the memory 206. The processor 202 may be configured to execute computer instructions, for example, the processor 202 may be a central processing unit (CPU). The network interface 204 is configured to allow the database 140 to transmit and receive data in the network 120. The network interface 204 may include one or more network interface cards (NICs). The memory 206 stores data and instructions. As illustrated, the memory 206 stores one or more contact lists 208.

As illustrated, the contact list includes a plurality of field types 210, such as name, email, telephone, street address and city, state, zip. Persons skilled in the art will recognize that other field types 210 may also be stored. For example, the field types 210 may further include a birthday or a photograph. The contact list 208 also includes a plurality of entries 212, 214, 216, 218, and 220. While only five entries 212, 214, 216, 218, and 220 are illustrated in FIG. 2, persons skilled in the art will recognize that a contact list 208 may include many more entries 212, 214, 216, 218, and 220. Each entry 212, 214, 216, 218 or 220 includes a set of field values 222 corresponding to the field types 210. However, some field values 222 in some entries 212, 214 or 216 may be blank. For example, as illustrated the field value 222 associated with the email field type 210 in entry 212 is blank. Other field values 222, for example, the field value 222 associated with the telephone number field type of entry 212, may not be blank and may contain a value (e.g., 650-555-1212). The value may be a string, a number, an image file or any other value that may be stored in the memory 206 of the database 140.

Furthermore, while the subject technology is described herein in conjunction with a contact list 208, persons skilled in the art will appreciate that the subject technology may be applied in other contexts where more than one entry 212, 214, or 216 may be associated with the same entity. For example, the subject technology may be applicable to vehicle history records that include accident records, repair records, service records, dealership records, and insurance company records, and automobile registration records, which may be disjointed and stored in various sources that may be combined. Similarly, the subject technology may be applicable to driving records which are comprised of accident records, ticket records, and automobile registration records, which, similarly, may be disjointed and stored in various sources that may be combined. Persons skilled in the art will, undoubtedly, recognize additional contexts in which the subject technology may be implemented.

Figure 3:
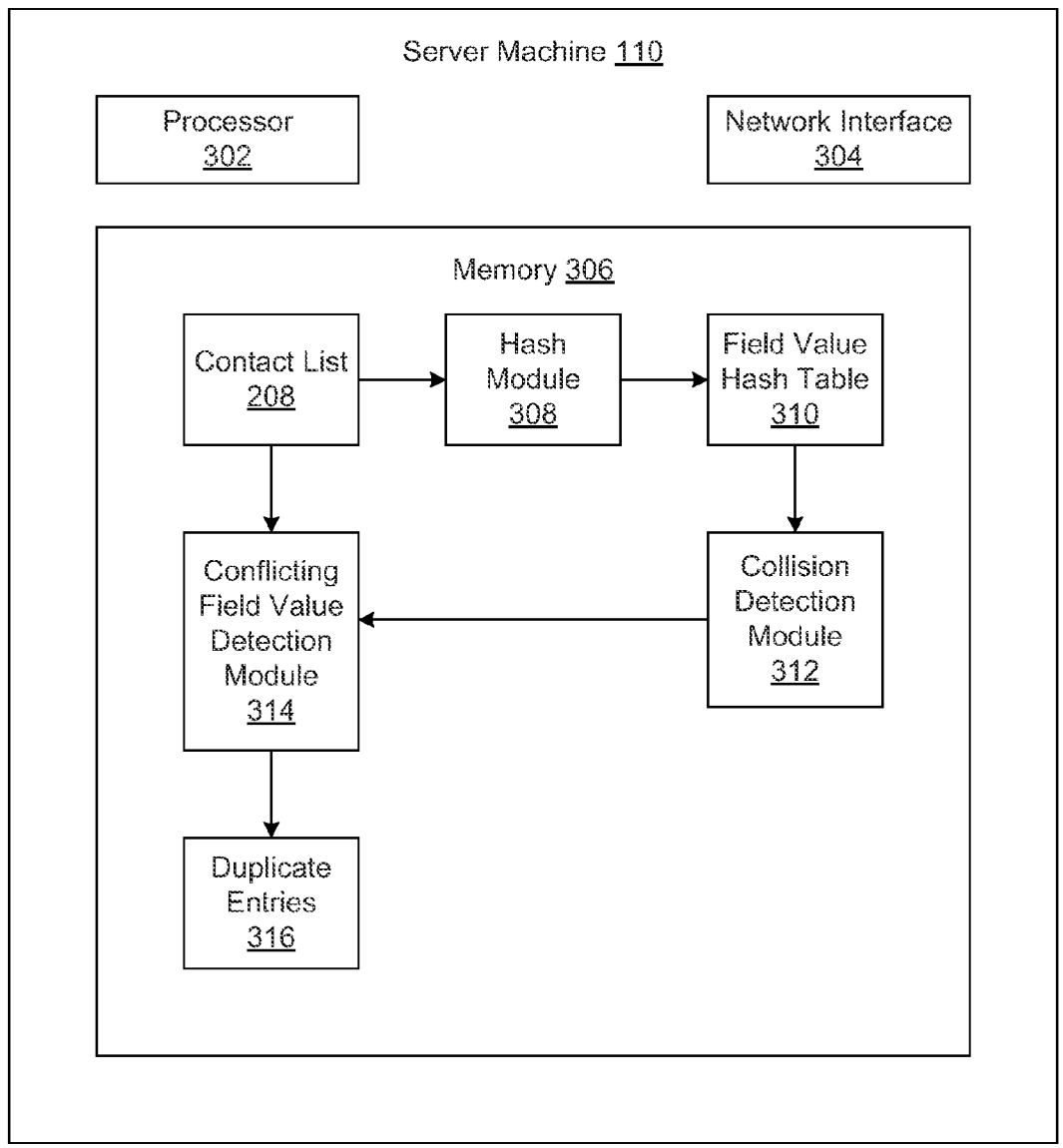
FIG. 3 illustrates an example of the server machine of FIG. 1 in more detail.

FIG. 3 illustrates an example of the server machine 110 of FIG. 1 in more detail.

As shown, the server machine 110 includes a processor 302, a network interface 304, and a memory 306. The processor 302 is configured to execute computer instructions that are stored in a computer-readable medium, such as the memory 306. The processor 302 may be configured to execute computer instructions, for example, the processor 302 may be a central processing unit (CPU). The network interface 304 is configured to allow the server machine 110 to transmit and receive data in the network. The network interface 304 may include one or more network interface cards (NICs). The memory 306 stores data and instructions. As illustrated, the memory 306 stores a contact list 208, a hash module 308, a "field value hash table" 310, a "collision detection module" 312, a "conflicting field value detection module" 314, and duplicate entries 316.

The contact list 208 may be received from the database 140 in order for the server machine 110 to identify duplicate entries in the contact list 208. The contact list 208 may include a set of entries 212, 214, 216, 218, and 220 associated with field values 222, which are associated with field types 210.

The hash module 308, is configured to generate the "field value hash table" 310 from the contact list by applying a hash function to calculate a hash value for a plurality of the non-blank field value 222, for example, to all of the non-blank field values 222 or to a subset of the non-blank field values 222. The same hash function may be implemented for each non-blank field value 222. Alternatively, the hash function for each non-blank field value 222 may be based on the field type 210 of the field value 222. For example, a different hash function may be implemented for each of the name field type 210, the email field type 210, and the telephone field type 210. In one aspect, the hash function is designed to minimize collisions (equal hash values) between unequal field values 212. For example, a collision may occur between the email field value 222 of entry 212 and the email field value 222 of entry 214 because both represent the email address bitdiddle@email.com. However, a collision may not occur between the email field value 222 for entry 214 (bitdiddle@email.com) and the email field value 222 for entry 216 (boris.k@first.com) because the former and the latter refer to different strings.

After the field value hash table 310 is generated, the "collision detection module" 312 determines whether there are any collisions. A collision occurs when two inputs to a hash function yield the same output, for example, if the two inputs are equal. If two field values 222 in two different entries 212, 214, 216, 218 or 220 are equal, then the two entries likely refer to the same entity and further analysis may be required to determine whether the two entries are duplicates. The two field values 222 in the two different entries 212, 214, 216, 218 or 220 may be associated with the same field type 210 or with different field types 210. In the contact list 208 of FIG. 2, the collision detection module 312 may detect collisions between the following equal field values: (1) the telephone field values 222 of entry 212 and entry 214, (2) the street address and city, state, zip field values 222 of entry 212 and entry 218, (3) the email field values 222 of entry 214 and entry 216, and (4) the email field values 222 of entry 218 and entry 220. It should be noted that, in some cases two entries 212 and 218 may have the equal field values 222 for one field type (e.g. street address) that may be detected by the collision detection module 312. Nevertheless, these entries 212 and 218 may not be duplicates. For example, the people associated with the entries 212 and 218 may be roommates or office mates who share the same street address but have different names, email addresses, and mobile telephone numbers.

The entries 212, 214, 216, 218 or 220 detected to have collisions by the collision detection module 312 may be transmitted to the "conflicting field value detection module" 314. The "conflicting field value detection module" 314 further analyzes the field values 222 in the entries that are likely to be duplicates to determine whether there are any conflicting field values 222 that cannot co-exist in a single entry 212, 214, 216, 218 or 220. For example, in a contact list 208, a single contact entry 212, 214, 216, 218 or 220 may have multiple different email address field values 222, multiple different telephone number field values 222, and multiple different street address field values 222. However, in one aspect, a single contact entry 212, 214, 216, 218 or 220 may not have inconsistent names. For example, a single contact may not have both of the names "Benjamin Bitdiddle" and "Boris Krotov."

The "conflicting field value detection module" 314 may be configured to receive two non-blank field values 222 from two entries 212, 214, 216, 218 or 220 and determine whether the field value 222 in the first entry 212, 214, 216, 218 or 220 conflicts with the field value 22 in the second entry 212, 214, 216, 218 or 220. One technique the "conflicting field value detection module" 314 may implement involves determining that one entry 216 is a sub-entry of another entry 214 to the degree that each non-blank field value 222 in entry 216 is equal to a non-blank field value 222 in entry 214. This technique may be implemented when one of the field values has a blank name field value 222 or in other circumstances.

Another technique the conflicting field value detection module 314 may implement involves determining that the field value 222 in one entry 218 and the field value 222 in another entry 220 are associate with the same field type 210, for example the telephone field type 210. Next, the conflicting field value detection module 314 may determine that the field value 222 in the first entry 218 is different from the field value 222 in the second entry 218, but that multiple field values 222 having the telephone field type 210 may be associated with the same entry 218 or 220. For example, a single contact entry 212, 214, 216, 218 or 220 may have multiple telephone numbers, including a mobile telephone number, a home telephone number or a work telephone number.

Yet another technique the conflicting field value detection module 314 may implement involves determining that the two non-blank field values 222 in the two entries 218 and 220 are of the same field type 210, for example the name field type 210, calculating a Hamming distance between the two field values 222, and determining that the Hamming distance is less than a Hamming distance threshold. The Hamming distance is generally measured as a number of positions in which two strings are different. If one string is shorter than another, blanks or spaces may be appended to the shorter string, for the purpose of the Hamming distance calculation, to make the two strings have the same length. For example, the strings in the name field values 222 of entries 218 and 220 are "Boris Krotov" and "Boris K," respectively. The characters "r-o-t-o-v" appear in "Boris Krotov" but not in "Boris K." The Hamming distance is the number of different characters in the two strings (five in the example case).

One more technique the conflicting field value detection module 314 may implement involves determining that the two non-blank field values 222 in the two entries 212 and 214 are of the same field type 210, for example the name field type 210, calculating a sequence alignment between the two field values 222 according to the Needleman-Wunsch algorithm, and determining that the sequence alignment is greater than a sequence alignment threshold. In general, according to the Needleman-Wunsch algorithm, the sequence alignment measures the global alignment of two strings, the number of residues of one string that can be matched against another. For example, the strings in the name field values 222 of entries 212 and 214 are "Benjamin Bitdiddle" and "Ben Bitdiddle," respectively. The two substrings "Ben" and "_Bitdiddle" of the string "Ben Bitdiddle" appear in "Benjamin Bitdiddle." Therefore, the two strings have a high sequence alignment according to the Needleman-Wunsch algorithm. Persons skilled in the art will recognize other approaches as to how the conflicting field value detection module 314 may operate.

One case for which the conflicting field value detection module 314 may account is a contact entry 212, 214, 216, 218 or 220 that includes the word "and" or the character '&' in the name field. For example, one contact entry (not illustrated) may include in its field values 222 a name "Jenny Baker," a telephone number 949-867-5309, and an email address jenny@baker.com. Another contact entry (not illustrated) may include in its field values 222 a name "Tom & Jenny Baker," and a telephone number 949-867-5309. In this example, the collision detection module 312 may detect that the "Jenny Baker" entry and the "Tom & Jenny Baker" entry have the same telephone number. However, the conflicting field value detection module 314 may detect that the name field values 222 "Jenny Baker" and "Tom & Jenny Baker" cannot co-exist in a single contact entry 212, 214, 216, 218 or 220, in spite of the similarity of the strings under either the Hamming distance or Needleman-Wunsch sequence alignment technique, due to the presence of the character in the string. As a result of the correct detection of the distinction between the contact entries "Jenny Baker" and "Tom & Jenny Baker," the email address jenny@baker.com may not be associated with the "Tom & Jenny Baker" contact entry.

The entries 212, 214, 216, 218 or 220 determined to be non-conflicting duplicate entries 212, 214, 216, 218 or 220 by conflicting field value detection module 314 are stored as duplicate entries 316 for further processing. The duplicate entries 316 may be provided as output, for example, for review of the user of the contact list 208. The duplicate entries 316 may be automatically merged into single entries including the field values 222 from both duplicate entries 316. Persons skilled in the art will recognize other approaches to further processing the duplicate entries 316.

Figure 4:
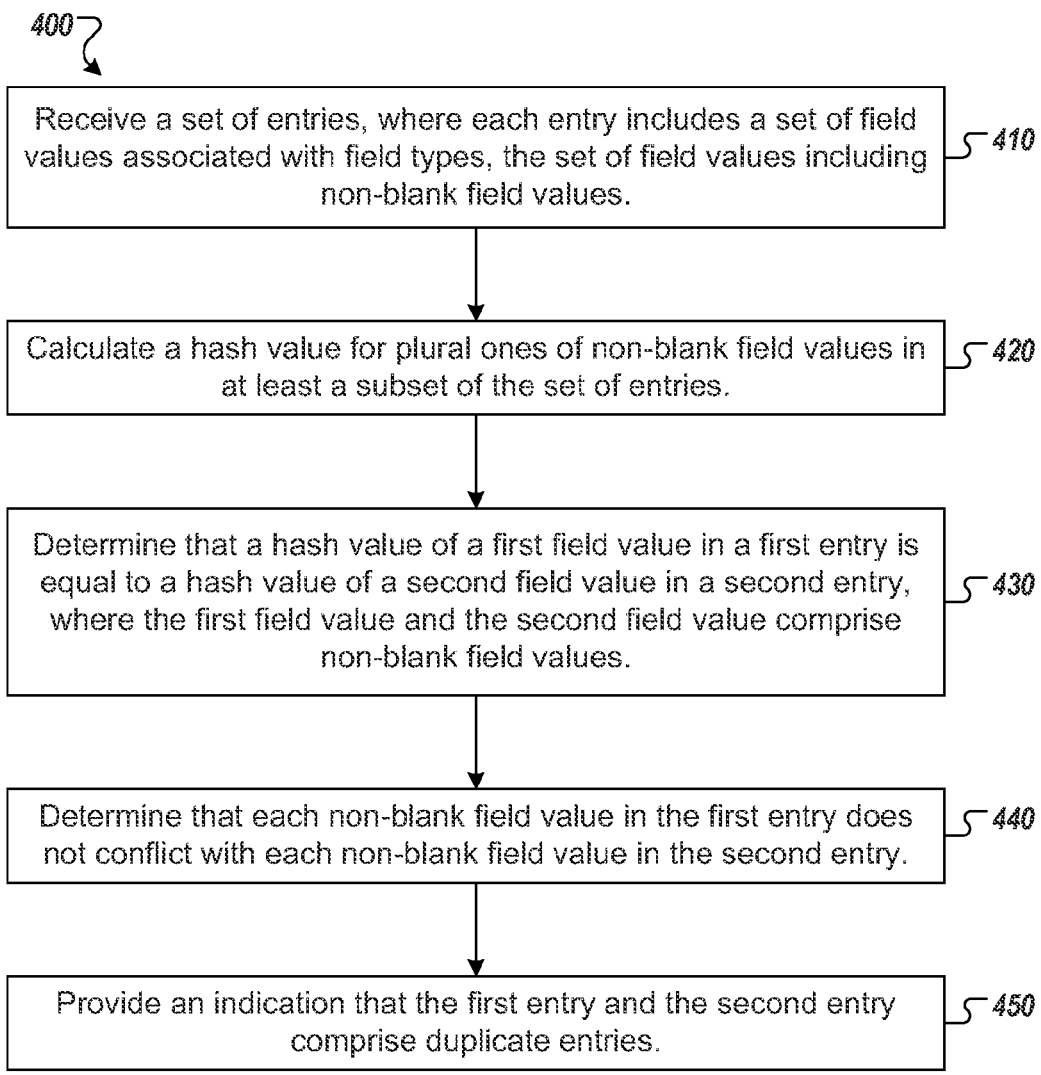
FIG. 4 illustrates a process by which duplicate entries may be identified.

FIG. 4 illustrates a process 400 by which duplicate entries 316 may be identified.

The process 400 begins at step 410 where the server machine 110 receives a set of entries 212, 214, 216, 218, and 220. Each entry 212, 214, 216, 218, and 220 may include a set of field values 222 associated with field types 210. The set of field values 222 may include blank and non-blank field values 222. The entries 212, 214, 216, 218, and 220 may include contact entries 212, 214, 216, 218, and 220 in a contact list 208, and the set of entries 212, 214, 216, 218, and 220 may comprise a contact list 208. However, persons skilled in the art will recognize other entries 212, 214, 216, 218, and 220 in conjunction with which the subject technology may be implemented.

According to step 420, the server machine 110 calculates a hash value for plural ones of non-blank field values 222 in at least a subset of the set of entries 212, 214, 216, 218, and 220. The hash value may be calculated via a hash function. The server machine 110 may implement the same hash function for each non-blank field value 222. Alternatively, the hash function that the server machine 110 implements for each non-blank field value 222 may be based on the field type 210 of the field value 222. For example, a different hash function may be implemented for each of the name field type 210, the email field type 210, the telephone field type 210, and the street address field type 210. In one aspect, the hash function is designed to minimize collisions (equal hash values) between unequal field values 212. For example, a collision may occur between the email field value 222 of entry 212 and the email field value 222 of entry 214 because both represent the email address bitdiddle@email.com. However, a collision may not occur between the email field value 222 for entry 214 (bitdiddle@email.com) and the email field value 222 for entry 216 (boris.k@first.com) because the former and the latter refer to different strings.

According to step 430, the server machine 110 determines that the hash value of a first field value 222 in a first entry 212, 214, 216, 218 or 220 is equal to or corresponds to the hash value of a second field value 222 in a second entry 212, 214, 216, 218 or 220. In one implementation, the first field value 222 and the second field value 222 may be associated with the same field type 210. However, in another implementation the first field value 222 and the second field value 222 may be associated with different field types 210. For example, the first field value 222 may be associated with a name field type 210 and the second field value 222 may be associated with an email address field type 210. The first field value 222 and the second field value 222 may be non-blank field values 222. The server machine 110 may determine that the hash value of the first field value 222 and the hash value of the second field value 222 are equal by detecting a collision in the field value hash table 310. Field values 222 having equal hash values may be subject to further analysis to determine whether these field values correspond to entries 212, 214, 216, 218 or 220 that are duplicate entries 316. Specifically, the first entry 212, 214, 216, 218 or 220 and the second entry 212, 214, 216, 218 or 220 may be subject to further analysis to determine whether these two entries 212, 214, 216, 218 or 220 are duplicate entries 316.

According to step 440, the server machine 110 determines that each non-blank field value 222 in the first entry 212, 214, 216, 218 or 220 does not conflict with each non-blank field value 222 in the second entry 212, 214, 216, 218 or 220. The server machine 110 may determine that each non-blank field value 222 in the first entry 212, 214, 216, 218 or 220 does not conflict with each non-blank field value 222 in the second entry 212, 214, 216, 218 or 220 via the operation of the "conflicting field value detection module" 314 described above. In addition, if the first field value 222 and the second field value 222 are not equal, the server machine may determine whether the field type 210 of the first field value 222 and the second field value 222 may accommodate multiple different values, for example, in a contact list 208, a contact entry 212, 214, 216, 218 or 220 may have multiple different email addresses and multiple different telephone numbers, but not multiple different names. If a conflict exist for a field type 210 that cannot accommodate multiple different field values then the first entry 212, 214, 216, 218 or 220 and the second entry 212, 214, 216, 218 or 220 may not comprise duplicate entries. Otherwise, the first entry 212, 214, 216, 218 or 220 and the second entry 212, 214, 216, 218 or 220 may comprise duplicate entries.

According to step 450, the server machine 110 provides an indication that the first entry 212, 214, 216, 218 or 220 and the second entry 212, 214, 216, 218 or 220 comprise duplicate entries. The server machine merge the first entry 212, 214, 216, 218 or 220 and the second entry 212, 214, 216, 218 or 220 into a single entry or inform a user of a client computing device 130 that the first entry 212, 214, 216, 218 or 220 and the second entry 212, 214, 216, 218 or 220 may be duplicate entries 316. After step 450, the process 400 ends.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software inventions can be implemented as sub-parts of a larger program while remaining distinct software inventions. In some implementations, multiple software inventions can also be implemented as separate programs. Finally, any combination of separate programs that together implement a software invention described here is within the scope of the invention. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
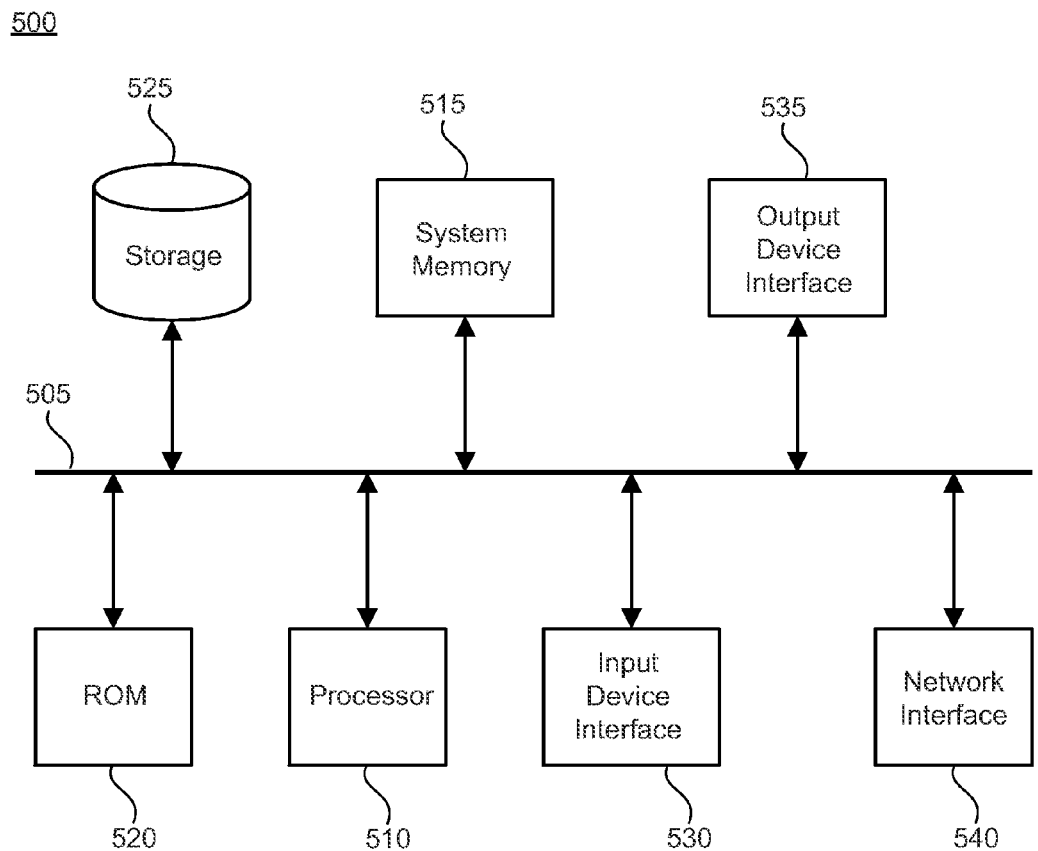
FIG. 5 conceptually illustrates an electronic system with which some implementations of the subject technology are implemented.

FIG. 5 conceptually illustrates an electronic system 500 with which some implementations of the subject technology are implemented. The electronic system 500 can be a computer, phone, PDA, or any other sort of electronic device. Such an electronic system includes various types of computer readable media and interfaces for various other types of computer readable media. Electronic system 500 includes a bus 505, processing unit(s) 510, a system memory 515, a read-only memory 520, a permanent storage device 525, an input device interface 530, an output device interface 535, and a network interface 540.

The bus 505 collectively represents all system, peripheral, and chipset buses that communicatively connect the numerous internal devices of the electronic system 500. For instance, the bus 505 communicatively connects the processing unit(s) 510 with the read-only memory 520, the system memory 515, and the permanent storage device 525.

From these various memory units, the processing unit(s) 510 retrieves instructions to execute and data to process in order to execute the processes of the subject technology. The processing unit(s) can be a single processor or a multi-core processor in different implementations.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off. Some implementations of the invention use a mass-storage device (such as a magnetic or optical disk and its corresponding disk drive) as the permanent storage device 525.

Other implementations use a removable storage device (such as a floppy disk, flash drive, and its corresponding disk drive) as the permanent storage device 525. Like the permanent storage device 525, the system memory 515 is a read-and-write memory device. However, unlike storage device 525, the system memory 515 is a volatile read-and-write memory, such a random access memory. The system memory 515 stores some of the instructions and data that the processor needs at runtime. In some implementations, the processes of the subject technology are stored in the system memory 515, the permanent storage device 525, and/or the read-only memory 520. For example, the various memory units include instructions for identifying duplicate entries, in accordance with some implementations. From these various memory units, the processing unit(s) 510 retrieves instructions to execute and data to process in order to execute the processes of some implementations.

The bus 505 also connects to the input and output device interfaces 530 and 535. The input device interface 530 enables the user to communicate information and select commands to the electronic system. Input devices used with input device interface 530 include, for example, alphanumeric keyboards and pointing devices (also called "cursor control devices"). Output device interfaces 535 enables, for example, the display of images generated by the electronic system 500. Output devices used with output device interface 535 include, for example, printers and display devices, such as cathode ray tubes (CRT) or liquid crystal displays (LCD). Some implementations include devices such as a touchscreen that function as both input and output devices.

Finally, as shown in FIG. 5, bus 505 also couples electronic system 500 to a network (not shown) through a network interface 540. In this manner, the electronic system 500 can be a part of a network of computers (such as a local area network ("LAN"), a wide area network ("WAN"), or an Intranet, or a network of networks, such as the Internet. Any or all components of electronic system 500 can be used in conjunction with the invention.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for identifying duplicate entries within a set of entries, the method comprising:
   receiving the set of entries, wherein each entry comprises a set of field values associated with field types, the set of field values comprising non-blank field values;
   calculating a hash value for plural ones of the non-blank field values in at least a subset of the set of entries;
   determining that a hash value of a first field value in a first entry corresponds to a hash value of a second field value in a second entry, wherein the first field value and the second field value comprise non-blank field values;
   determining that each non-blank field value in the first entry does not conflict with each non-blank field value in the second entry by:
      determining that a first field type cannot accommodate multiple different field values for a single entry, the first field type defining a type of data stored in an associated field value;
      calculating a sequence alignment between a field value of the first field type in the first entry and a field value of the first field type in the second entry; and
      determining, based on the calculated sequence alignment being greater than a sequence alignment threshold, that the first field type is not associated with different non-blank field values in the first entry and the second entry; and
   providing, in response to determining that each non-blank field value in the first entry does not conflict with each non-blank field value in the second entry, an indication that the first entry and the second entry comprise duplicate entries.

2. The method of claim 1, wherein the set of field values further comprises blank field values.

3. The method of claim 1, wherein the first field value and the second field value are associated with a same field type.

4. The method of claim 1, wherein a field type associated with the first field value is different from a field type associated with the second field value.

5. The method of claim 1, wherein the entries comprise contact entries.

6. The method of claim 5, wherein each field value is associated with one field type, wherein the field types comprise a name field type, an email address field type, a street address field type, or a telephone number field type.

7. The method of claim 1, further comprising merging the first entry and the second entry into a single entry.

8. The method of claim 1, wherein the hash value for each field value in the plurality of non-blank field values is computed based on a hash function associated with the field type of the field value.

9. The method of claim 1, wherein determining that each non-blank field value in the first entry does not conflict with each non-blank field value in the second entry comprises:
   determining that each non-blank field value in the first entry is equivalent to a non-blank field value in the second entry, or determining that each non-blank field value in the second entry is equivalent to a non-blank field value in the first entry.

10. The method of claim 1, wherein determining that each non-blank field value in the first entry does not conflict with each non-blank field value in the second entry comprises:
    determining at least one field type, wherein the at least one field type is associated with a non-blank field value in the first entry and a non-blank field value in the second entry;
    determining that the non-blank field value in the first entry is not equivalent to the non-blank field value in the second entry; and
    determining that the at least one field type may be associated with multiple field values in a single entry.

11. The method of claim 1, wherein determining that each non-blank field value in the first entry does not conflict with each non-blank field value in the second entry comprises:
    determining at least one field type, wherein the at least one field type is associated with a non-blank field value in the first entry and a non-blank field value in the second entry;
    calculating a Hamming distance between the non-blank field in the first entry and the non-blank field in the second entry; and
    determining that the Hamming distance is less than a Hamming distance threshold.

12. The method of claim 1, wherein determining that each non-blank field in the first entry does not conflict with each non-blank field in the second entry comprises:
    determining at least one field type, wherein the at least one field type is associated with a non-blank field value in the first entry and a non-blank field value in the second entry;
    calculating a sequence alignment between the non-blank field in the first entry and the non-blank field in the second entry according to a Needleman-Wunsch algorithm; and
    determining that the sequence alignment is greater than a sequence alignment threshold.

13. A non-transitory computer-readable medium comprising instructions that, when executed by a computer, cause the computer to:
    receive a set of entries, wherein each entry comprises a set of field values associated with field types, the set of field values comprising blank field values and non-blank field values;
    calculate a hash value for plural ones of the non-blank field values in at least a subset of the set of entries;
    determine that a hash value of a first field value in a first entry corresponds to a hash value of a second field value in a second entry, wherein the first field value and the second field value comprise non-blank field values;
    determine that each non-blank field value in the first entry does not conflict with each non-blank field value in the second entry by:
       determining that a first field type cannot accommodate multiple different field values for a single entry, the first field type defining a type of data stored in an associated field value;
       calculating a sequence alignment between a field value of the first field type in the first entry and a field value of the first field type in the second entry; and
       determining, based on the calculated sequence alignment being greater than a sequence alignment threshold, that the first field type is not associated with different non-blank field values in the first entry and the second entry; and
    provide, in response to determining that each non-blank field value in the first entry does not conflict with each non-blank field value in the second entry, an indication that the first entry and the second entry comprise duplicate entries.

14. The non-transitory computer-readable medium of claim 13, wherein the first field value and the second field value are associated with a same field type.

15. The non-transitory computer-readable medium of claim 13, wherein a field type associated with the first field value is different from a field type associated with the second field value.

16. The non-transitory computer-readable medium of claim 13, wherein the entries comprise contact entries.

17. The non-transitory computer-readable medium of claim 16, wherein each field value is associated with one field type, wherein the field types comprise a name field type, an email address field type, a street address field type, or a telephone number field type.

18. The non-transitory computer-readable medium of claim 13, further comprising instructions that, when executed by a computer, cause the computer to:
 merge the first entry and the second entry into a single entry.

19. The non-transitory computer-readable medium of claim 13, wherein the hash value for each field value in the plurality of non-blank field values is computed based on a hash function associated with the field type of the field value.

20. The non-transitory computer-readable medium of claim 13, wherein the instructions for determining that each non-blank field value in the first entry does not conflict with each non-blank field value in the second entry comprise instructions that, when executed by a computer, cause the computer to:
 determine that each non-blank field value in the first entry is equivalent to a non-blank field value in the second entry or determine that each non-blank field value in the second entry is equivalent to a non-blank field value in the first entry.

21. The non-transitory computer-readable medium of claim 13, wherein the instructions for determining that each non-blank field value in the first entry does not conflict with each non-blank field value in the second entry comprise instructions that, when executed by a computer, cause the computer to:
 determine at least one field type, wherein the at least one field type is associated with a non-blank field value in the first entry and a non-blank field value in the second entry;
 determine that the non-blank field value in the first entry is not equivalent to the non-blank field value in the second entry; and
 determine that the at least one field type may be associated with multiple field values in a single entry.

22. The non-transitory computer-readable medium of claim 13, wherein the instructions for determining that each non-blank field value in the first entry does not conflict with each non-blank field value in the second entry comprise instructions that, when executed by a computer, cause the computer to:
 determine at least one field type, wherein the at least one field type is associated with a non-blank field value in the first entry and a non-blank field value in the second entry;
 calculate a Hamming distance between the non-blank field in the first entry and the non-blank field in the second entry; and
 determine that the Hamming distance is less than a Hamming distance threshold.

23. The non-transitory computer-readable medium of claim 13, wherein the instructions for determining that each non-blank field value in the first entry does not conflict with each non-blank field value in the second entry comprise instructions that, when executed by a computer, cause the computer to:
 determine at least one field type, wherein the at least one field type is associated with a non-blank field value in the first entry and a non-blank field value in the second entry;
 calculate a sequence alignment between the non-blank field in the first entry and the non-blank field in the second entry according to a Needleman-Wunsch algorithm; and
 determine that the sequence alignment is greater than a sequence alignment threshold.

24. A system comprising:
processing hardware; and
a memory comprising instructions that, when executed by the processing hardware, cause the processing hardware to:
 receive the set of contact entries, wherein each contact entry comprises a set of field values associated with field types, the set of field values comprising non-blank field values;
 calculate a hash value for plural ones of the non-blank field values in at least a subset of the set of entries;
 determine that a hash value of a first field value in a first contact entry corresponds to a hash value of a second field value in a second contact entry, wherein the first field value and the second field value comprise non-blank field values;
 determine that each non-blank field value in the first contact entry does not conflict with each non-blank field value in the second contact entry by:
  determining that a first field type cannot accommodate multiple different field values for a single entry, the first field type defining a type of data stored in an associated field value;
  calculating a sequence alignment between a field value of the first field type in the first entry and a field value of the first field type in the second entry; and
  determining, based on the calculated sequence alignment being greater than a sequence alignment threshold, that the first field type is not associated with different non-blank field values in the first entry and the second entry; and
 provide, in response to determining that each non-blank field value in the first entry does not conflict with each non-blank field value in the second entry, an indication that the first contact entry and the second contact entry comprise duplicate entries.

25. The method of claim 1, wherein determining that each non-blank field value in the first entry does not conflict with each non-blank field value in the second entry comprises:
 determining that a second field type is not associated with a non-blank string that includes the substrings "&" or "and" in exactly one but not both of the first entry and the second entry.

* * * * *